United States Patent [19]
DeKozan et al.

[11] 3,864,522
[45] Feb. 4, 1975

[54] AUTOMATIC TELEPHONE LOCATION SYSTEM

[75] Inventors: Raymond L. DeKozan; Edwin M. Salkeld, Jr., both of San Diego; Elsmore W. Bush, La Jolla, all of Calif.

[73] Assignee: Cubic Corporation, San Diego, Calif.

[22] Filed: Nov. 2, 1972

[21] Appl. No.: 303,109

[52] U.S. Cl. .................................................. 179/5.5
[51] Int. Cl. .......................................... H04m 15/06
[58] Field of Search .............. 179/5.5, 2 A, 2 DP, 3, 179/4, 6 E, 90 B

[56] References Cited

UNITED STATES PATENTS

| | | | |
|---|---|---|---|
| 3,307,147 | 2/1967 | Goldman | 179/2 DP |
| 3,400,378 | 9/1968 | Smith | 179/2 A |
| 3,427,403 | 2/1969 | Stokes | 179/2 A |
| 3,516,062 | 6/1970 | Spraker | 179/2 DP |
| 3,517,137 | 6/1970 | Ribner | 179/2 DP |
| 3,614,324 | 10/1971 | Buzzard | 179/2 DP |
| 3,686,440 | 8/1972 | Kroeger | 179/5.5 |
| 3,702,902 | 11/1972 | Willis | 179/5 R |
| 3,718,764 | 2/1973 | Deschenes | 179/2 DP |
| 3,727,003 | 4/1973 | Paraskevakos | 179/5.5 |

*Primary Examiner*—William C. Cooper
*Assistant Examiner*—Thomas D'Amico
*Attorney, Agent, or Firm*—Brown & Martin

[57] ABSTRACT

An automatic telephone location system for determining the location of telephones used in making calls to telephones at emergency stations. In response to a call, the emergency station telephone sends out an interrogating signal. The calling telephone in response to the interrogating signal sends out a two-tone address signal representing the address of the calling telephone. The emergency telephone decodes the two-tone signal into the address of the calling telephone which address is stored or displayed.

6 Claims, 1 Drawing Figure

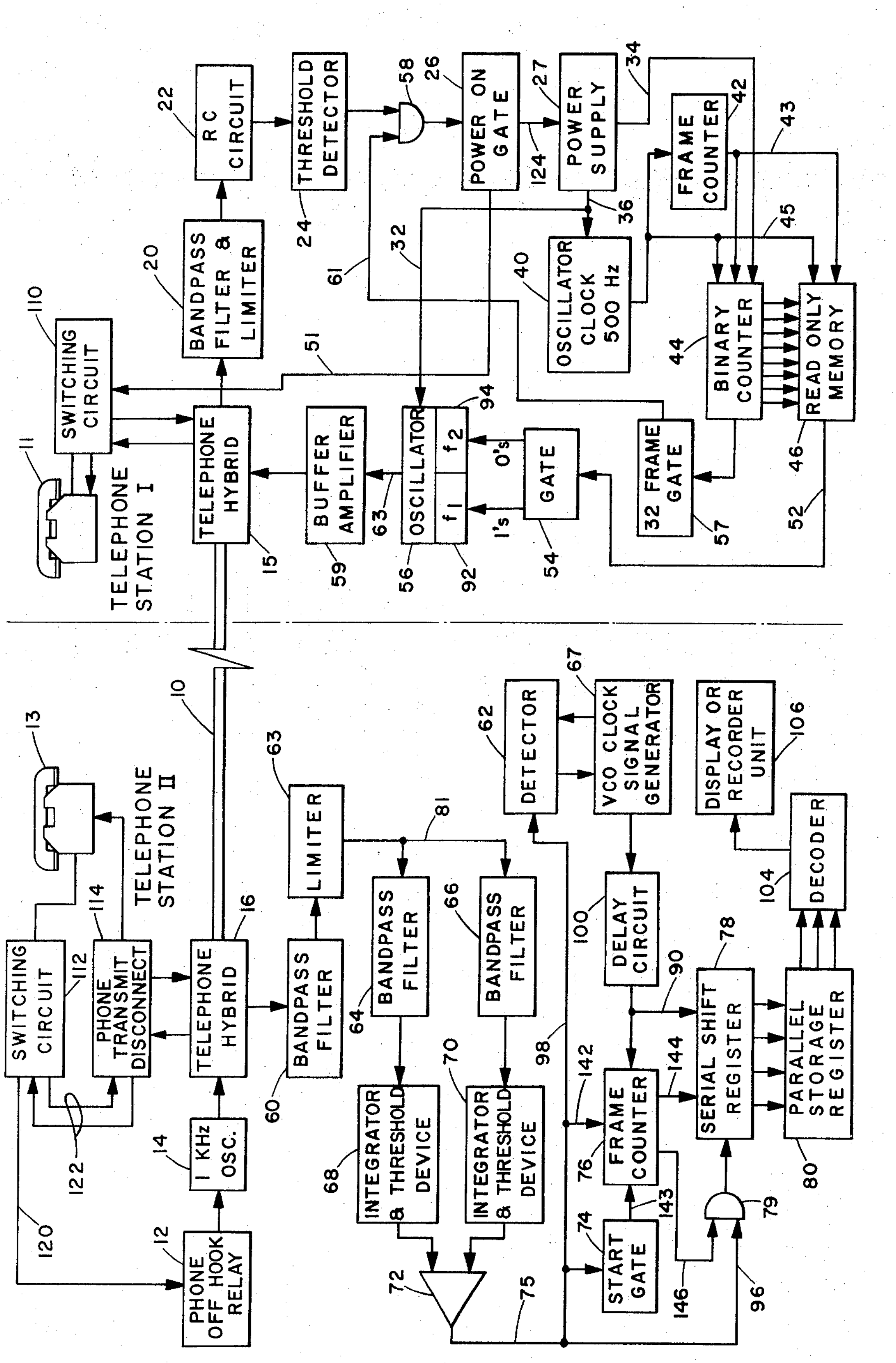
TELEPHONE STATION I
TELEPHONE STATION II
SWITCHING CIRCUIT
BANDPASS FILTER & LIMITER
RC CIRCUIT
THRESHOLD DETECTOR
POWER ON GATE
POWER SUPPLY
FRAME COUNTER
OSCILLATOR CLOCK 500 Hz
BINARY COUNTER
READ ONLY MEMORY
TELEPHONE HYBRID
BUFFER AMPLIFIER
OSCILLATOR
f2
f1
0's
1's
GATE
32 FRAME GATE
PHONE OFF HOOK RELAY
1 KHz OSC.
PHONE TRANSMIT DISCONNECT
BANDPASS FILTER
LIMITER
INTEGRATOR & THRESHOLD DEVICE
DETECTOR
VCO CLOCK SIGNAL GENERATOR
DISPLAY OR RECORDER UNIT
DELAY CIRCUIT
DECODER
START GATE
SERIAL SHIFT REGISTER
PARALLEL STORAGE REGISTER

AUTOMATIC TELEPHONE LOCATION SYSTEM

BACKGROUND OF THE INVENTION

Todays widespread and versatile telephone networks are unique. Within fractions of a second, users can converse from one end of the country to the other or to persons in other countries. However recent emphasis on crime deterrents and emergency services has caused the telephone industry to examine the effectiveness of emergency services offered by telephone networks.

To obtain emergency services, it is normally necessary to dial the operator of the seven-digit number of the police, fire or other emergency service agency desired. Normally this method does not obtain one hundred percent effective response. Thus lives and property are lost due to excessive delay in response. Much of this delay can be attributed to the failure of the caller to transmit to the emergency dispatcher the location of the call or the incident. Thus this is a weak link in the chain. Further, the location of the telephone or the incident is not always readily available to the caller or the caller may not be effective in conveying this information because of shock, inability to converse, unknown geographical areas and numerous other reasons.

So it is advantageous to have a system that when a telephone call is made from a normal telephone station to an emergency station, the emergency station is immediately informed of the address and location of the telephone from which the emergency call is made.

SUMMARY OF THE INVENTION

In an embodiment of this invention, the telephone location system transmits address data by a differentially, phased-shift-keyed, audio tones. The system works in a normal automatic telephone system having a plurality of telephones connected by telephone networks through a central office. The emergency station has a receiving system for decoding the address or location from which the telephone call of an emergency nature is being made. The calling telephone is identified by a particular address signal which is generated by an address signal generating unit in the calling telephone.

The address signal generator at the first or calling telephone is activtated by a tone sequence sent from the called emergency telephone station. This tone, that may be 1 KHz, is passed through a band pass filter and limiter and is detected by a circuit that determines the presence of the desired tone for a given, predetermined period of time. This avoids interference or false keying by normal voice conversation. When the tone is present for the proper time, an oscillator signal is initiated that provides the clock signal for a binary counter and read only memory. The telephone address for the particular telephone is stored in the read only memory. The telephone address consists, for example, of 32 characters. When the system is activated by the interrogating pulse, the binary counter reads out the read only memory as controlled by a frame counter. Each frame, which may consist of 8 counts, is shifted into a modulator, that codes the audio tone for transmission over the telephone lines. Two frequencies are utilized in this output signal to indicate one's and zero's of the data from the read only memory. This serial transmission of two-tone information is fed to the emergency station telephone.

At the emergency station, the address information is passed through a band pass filter and limiter and then through a discriminator that detects and returns the tone address information to serial binary information. A VCO clock generator provides clock signals in synchronism with the incoming information. The output binary address information is then fed through frame counters to a serial shift register and to a parallel storage register. The address information is then decoded and displayed in characters on a display unit or recording unit. Thus the address of the emergency calling telephone is immediately available at the emergency station.

The data decoding is started from the time reference point of the interrogator pulse. When the emergency station-operator keys open the telephone line for the incoming call by raising the receiver, the interrogate pulse is generated and is applied to the telephone line connection. The first returning data from the calling station provides a synchronization of the logic in the emergency station unit. The first character sent from the calling telephone or first telephone contains alternate mark and space data, which serves to provide a frame synchronization for the received data at the emergency station. The first data bit thus sets the storage register, and succeeding data bits are counted by frames, such as eight at a time, to generate each received character. This data is loaded serially into the shift register and then buffered to the appropriate display.

It is therefore an object of this invention to provide a new and improved automatic telephone location system for use in automatic telephone systems to provide instantly the location of a calling party.

It is another object of the invention to provide a new and improved automatic telephone location system for use in automatic telephone systems that uses audio signaling to convey the address information, thus placing no restriction on the communication path.

It is another object of this invention to provide a new and improved automatic telephone location system for automatic telephone systems that does not require modification of normal and existing telephone office equipment, can work in party line systems, does not require maintenance of computer files, and can be used with automatic dialing equipment as an alarm for banks, service stations, or the like and does not require a private line to an emergency center.

Other objects and many advantages of this invention will become more apparent upon a reading of the following detailed description and an examination of the drawing, wherein like reference numerals designate like parts throughout and in which:

The single FIGURE in the drawing is a block diagram of an embodiment of the invention.

Referring now to the drawing, a calling telephone station 1 is representative of one of any of a plurality of first telephones from which emergency calls can be made. Telephone station II is representative of an emergency station telephone which may be a telephone at a police department, emergency rescue station, fire station or the like. The interconnecting telephone lines are that of any automatic telephone system and may use normal two-wire telephone communication lines, or microwave telephone systems or the like.

The telephone call is initiated by a telephone call from calling telephone staition 1 to emergency telephone station II. The person making the telephone call from telephone station 1, operates telephone 11 in the normal manner. The telephone is removed from the hook, and the normal telephone dialing is accomplished which dialing information passes through telephone hybrid 15 and telephone lines 10 and through an intervening telephone station, not shown, and then to the emergency station II. When the emergency station is connected to station 1, then the telephone ring is passed through telephone hybrid 16 and through the phone transmit disconnect 114 to telephone 13. Telephone 13 is operated in the normal manner by raising the telephone from the hook. When telephone 13 is raised, a switching circuit 112 is operated to send a signal through line 120 to the phone off hook relay 12. This relay energizes for a short predetermined period of time, a 1 KHz oscillator 14 that sends a 1 KHz signal through the telephone hybrid 16 and through telephone lines 10, as set up by the central station switching, to the telephone hybrid 15. During this period of time, the switching circuit 112 also sends a signal through lines 122 to the phone transmit disconnect, that disconnects the telephone circuits in telephone 13 from the telephone hybrid 16 thus preventing the 1 KHz oscillating signal from being fed into the speaker of the telephone 13. The 1 KHz signal then passes through the telephone hybrid 15, to the band pass filter and limiter 20.

Telephone hybrid circuits 15 and 16 are known standard transformer circuits that allow transmission in both directions on the line through the same wire. The band pass filter and limiter 20, filters out signals other than the 1 KHz incoming signal and feeds this signal to the RC circuit 22. The charging network of the RC circuit 22 charges on the 1 KHz tone until it reaches the threshold voltage of the threshold detector 24. The threshold detector being, for example, a one shot multivibrator, fires through gate 58 to the power on gate 26 that feeds a signal through line 51 to inhibit through switching circuit 110 the speaker in the telephone 11, and also feeds a signal through line 124 that energizes the power supply 27 that supplies power through lines 32, 34 and 36. This turns on oscillator clock circuit 40 that sends, for example, a 50 Hz signal through lines 45 to the frame counter 42, to the binary counter 44 and to the read only memory 46.

The frame counter 42 in turn sends an appropriate signal through line 43 to binary counter 44 and the read only memory 46. The frame counter 42 in response to the time reference clock signals for the digital gate from oscillator 40, counts the clock signals to assign a given number of counts to a particular letter that is to be read out from the read only memory 46. A given set number of frames are required to interrogate the counter 44 and the read only memory 46. For example, a given address for phone station 1 is set forth in 32 frames of the read only memory 46. Thus the frame counter 42 is reset for each frame going through 32 frames to provide the total address information. The first frame of information from the read only memory 46 contains only alternate marks and spaces, that provide a frame synchronization for the system at the emergency station, as will be explained in more detail hereinafter. The binary address information is supplied from read only memory 46 serially through line 52 and through gate 54 to the oscillator 56.

Oscillator 56 provides different frequency outputs for the binary information, but at the constant time frame of 500 Hz. So for example, for every one signal received by oscillator 56, then an $f_1$ frequency burst is fed through line 63. For every zero signal received a frequency $f_2$ burst is supplied through line 63. For example, $f_1$ tone or tone 1 for logic 1 may have a frequency of 1 KHz while the $f_2$ tone or tone 0 for the logic zero has a frequency of 2 KHz. The serial output in line 63 is then fed through buffer amplifier 59 that amplifies the signal to match the phone line impedences. The signal is then fed through telephone hybrid 15, lines 10 and telephone hybrid 16 to the band pass filter 60. Limiter 63 passes only the two frequency signals of interest.

Band pass filter 64 filters out the $f_1$ frequency to the integrator and threshold circuit 68 and band pass filter 66 filters out the frequency $f_2$ received through line 81 to the integrator and threshold device 70. The differential amplifier 72 receives the signals from the integrator and threshold devices 68 and 70 and provides an output binary signal corresponding to the output binary signal fed through line 52 to oscillator 56. Thus the circuit functions as a discriminator to reduce the input tone signals to binary information. These serial, binary, output signals are fed through line 75 and line 98 to detector 62. Detector 62 and VCO clock generator 67 form a phase lock loop oscillator that provides output clock signals for the given input signal frequency that is synchronized with the 500 Hz oscillator clock signal from oscillator 40 at telephone station 1. The VCO clock signal generator 67 normally generates a signal having a given frequency of which the generator circuit is capable of holding for a period of time.

The first character sent from telephone station 1 contains alternate mark and space information that provides pulse sets which are detected by detector 62, and are used to control the phase lock looop of the oscillator in the signal generator 67 to synchronize the block output signal with that of the oscillator clock 40. The clock output signals fed through delay circuit 100 and line 90 are thus in synchronism with the clock signals of telephone station 1. Since the phase lock loop circuit detects a change in state from positive or negative, the clock output is at the lead portion of the pulse. However the clock signals are fed through a delay circuit 100 that places the clock pulse in the center of the pulse.

Start gate 74 responds to the second character of the input address information to provide an output signal through line 143 that initiates the frame counter 76 to receive appropriate counts of the input address information through line 142. The frame counter then provides frame shift information to the serial shift register 78 through line 144 and also sends a gating signal through line 146 to gate gate 79 allowing the binary information to be fed through line 96 to the serial shift register 78. Frame counter 76 operates in the same manner as frame counter 42, and counts the first timing word to inhibit information passing through line 96 and gate 79 to the shift register 78. The frame counter 76 then sets up each serial data frame through the serial shift register 78 and dumps this frame of serial data into parallel storage register 80. Each word in the parallel storage register is then decoded by a decoder 104, where it is then fed into a display or recorder unit 106.

After the binary counter 44 has operated the read only memory 46 through its entire 32 characters of stored information, the 32 frame off gate 57 that counts these frames supplies an output signal through line 61 that inhibits gate 58. This closes power on gate 26 and shuts down power supply 27 and sends a signal through line 51 to the switching circuit 110 that returns the telephone 11 to the normal audio communication mode. It being recognized that the entire transmission of the interrogation signal and the return address information takes less than a second, and is not readily noticed as a delay in making a telephone communication between phones 11 and 13 of the two stations.

Having described our invention, we now claim.

1. An automatic telephone location system for determining the location or address of telephones used in making calls to telephones at certain stations in automatic telephone systems having a plurality of telephones connected by telephone networks through a central office or the like, comprising, a plurality of first telephones connected to a telephone network, a second telephone located at a second station and being connected to the telephone network, storage means at each of said first telephones for storing a coded address representing the location of the particular first telephone, interrogating signal means at said second telephone for sending an interrogation signal to said first telephone in response to a telephone call from said first telephone to said second telephone, detector means at said first telephone for detecting and receiving said interrogation signal and activating said storage means to send out a signal to said second telephone that is coded to the address of said first telephone, receiver means at said second telephone for receiving said address coded signal and decoding said address coded signal to identify the location of said first telephone, said storage means at said first telephones including a programmed memory unit, clock signal means for interrogating said programmed memory unit, tone generator means for generating serial two tone output signals of binary coded address information that are coded by signal outputs from said programmed memory unit, said receiver means including a tone detector means for detecting the difference between serially received serial tones, an address detector means for detecting the output of said tone detector means providing decoded address output signals corresponding to the address of the first telephones, means for displaying or storing the received decoded address output signals, said detector means including filter means for filtering a signal having the particular frequency of the interrogating signal, threshold detector means for receiving a signal from said filter means, said clock signal means including oscillator means for providing clock signals in response to an output signal from said threshold detector means, said program memory unit providing a digital output signal upon being interrogated by said clock signals, said digital output corresponding to the individual components of the address of the first telephones, and second oscillator means for providing a first frequency for a given digital signal of said digital output and a second frequency for a second digital signal of said digital output providing said two-tone output signal of binary coded addressed information.

2. An automatic telephone location system as claimed in claim 1 including, frame counter means for counting the output of the programmed memory unit and being responsive to a given number of output signal frames for inhibiting said detector means.

3. An automatic telephone location system as claimed in claim 2 in which, said detector means having means for automatically de-energizing the telephone speaker in said second telephone in response to said interrogating signal being transmitted to said second telephone.

4. An automatic system as claimed in claim 1 in which, said receiver means having a detector for detecting the frequency of said signals received from said first telephones and providing a clock signal in synchronism therewith, discriminator means for discriminating between said tones of said two-tone output signal received and providing binary serial data therefrom, register means for receiving and storing said binary serial data and decoder means for decoding said binary serial data into address information for storage or display.

5. An automatic telephone location system as claimed in claim 4 in which, switch circuit means for automatically switching off the audio to the speaker of the second telephone in response to said interrogation signal being transmitted.

6. An automatic telephone location system as claimed in claim 5 in which, each of said first telephones and said second telephone having a telephone hybrid circuit for transmitting the audio between said phones and for transmitting said interrogated signal and said coded address signal.

* * * * *